United States Patent [19]

Shiomi et al.

[11] 3,724,603

[45] Apr. 3, 1973

[54] COLLISION FORCE ABSORPTION DEVICE

[75] Inventors: Masanao Shiomi, Toyota; Tadataka Narumi, Kariya, both of Japan

[73] Assignee: Toyota Jidosha Kogyo Kabushiki Kaisha, Toyota-shi, Japan

[22] Filed: July 13, 1971

[21] Appl. No.: 162,202

Related U.S. Application Data

[62] Division of Ser. No. 884,675, Dec. 12, 1969.

[52] U.S. Cl. ............ 188/1 C, 267/144, 293/DIG. 3, 297/216
[51] Int. Cl. ............................................. F16d 63/00
[58] Field of Search ...188/1 C; 293/DIG. 3; 297/216; 267/144, 182

[56] References Cited

UNITED STATES PATENTS 2,165,274   7/1939   Kessenich ........................ 188/1 C
2,971,566   2/1961   Negroni ........................ 293/DIG. 3
3,059,966   10/1962  Spielman ........................ 293/DIG. 3

FOREIGN PATENTS OR APPLICATIONS 131,450   8/1919   Great Britain ........................ 188/1 C Primary Examiner—Gerald M. Forlenza
Assistant Examiner—Lawrence J. Oresky
Attorney—Berman, Davidson & Berman

[57]     ABSTRACT

An energy absorbing member in the shape of an elongated bar folded in its central portion to provide a plurality of closely spaced laminations each substantially perpendicular to the longitudinal axis of the bar, being capable of plastic deformation in one direction only, and being rigid in the opposite direction, said energy member being fixed at one end through a force receiving member to a vehicle accessory, such as a bumper, or a seat, and being fixed at the other end through a support member to the vehicle chassis.

2 Claims, 2 Drawing Figures

PATENTED APR 3 1973

3,724,603

INVENTORS
MASANAO SHIOMI,
TADATAKA NARUMI,

BY
Berman, Davidson & Berman,
ATTORNEYS.

COLLISION FORCE ABSORPTION DEVICE

CROSS REFERENCE TO RELATED APPLICATION

This application is a divisional application of our co-pending application Ser. No. 884,675 filed Dec. 12, 1969.

BACKGROUND OF THE INVENTION

The present invention relates to an energy absorbing device which may be incorporated in the seat assembly, or like portion of a vehicle to absorb the energy of a collision and protect the vehicle, the operator, or passengers from the collision force imparted from the exterior of the vehicle. With the recent increase in speed and number of automobiles, it has become socially important to safeguard the cars and their occupants against frequent injury from rear end collisions which impart whiplash to the occupants.

The present invention is intended to overcome this problem by providing an energy absorbing device, or devices, in combination with the bumper, the seat, or other parts of the vehicles so as to absorb the external collision force effectively to avoid injury to the occupants of the vehicles. Destruction of the vehicle parts is also avoided. The invention is further intended to provide a device which, after such collision, can be removed from the vehicle and replaced by a new energy absorbing member when the member is deformed beyond repair, or may be replaced by the same member when the deformation can be corrected and the energy absorbing member restored to its original condition.

SUMMARY

The device according to the invention comprises a receiving member for receiving external forces, a supporting member for supporting the receiving member movably, and an energy absorbing member having its ends respectively fixed to said receiving and supporting members. The energy absorbing member is formed of resilient material having high resistance to plastic deformation and is made of metal plate folded to provide closely spaced, or abutting laminations, whereby the absorbing member will not yield, or plastically deform in one direction, but will yield and deform when subjected to a force in the opposite direction, spreading apart the laminations.

A principal object of the invention is to provide an energy absorbing member secured at its ends to a relatively displaceable force receiving member and a fixed supporting member, such that a predetermined external force applied to the receiving member first displaces said member relative to the supporting member, and this displacement is converted to a force which plastically deforms and elongates the energy absorbing member to open the spaces between a plurality of closely spaced, or abutting laminations forming the energy absorbing member.

Another important object of the invention is to provide an energy absorbing member which comprises a metal plate having a number of folds, said member acting to spread the folds only upon receiving an external force in the direction of elongation and preventing such spreading upon receipt of an external force in the opposite direction tending to compress the member.

Yet another object of the invention is to provide an energy absorbing member, having the above described characteristics, which is of simple construction, easy and economical to produce, and easy to repair for reuse, or to replace by another and similar absorbing member.

A still further object of the invention is to provide an energy absorbing device, having the above described characteristics, which, after absorption of energy from an external force, can be replaced simply by again plastically deforming the deformed portion of the device to assume its original shape for repeated operations.

BRIEF EXPLANATION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several Figures, and in which:

PREFERRED EMBODIMENTS

Figure 1:
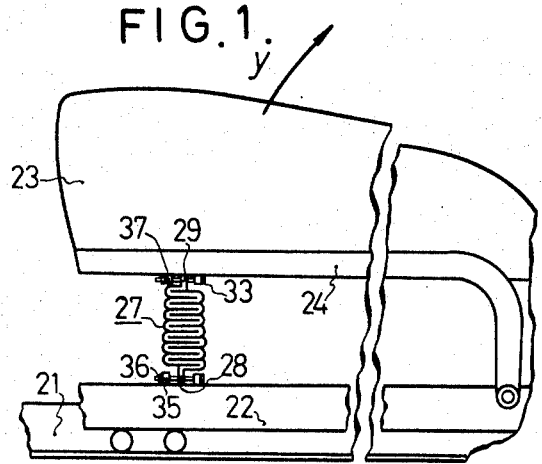
FIG. 1 is a fragmentary side elevation showing an embodiment of the invention incorporated in a seat assembly of a vehicle.
Figure 2:
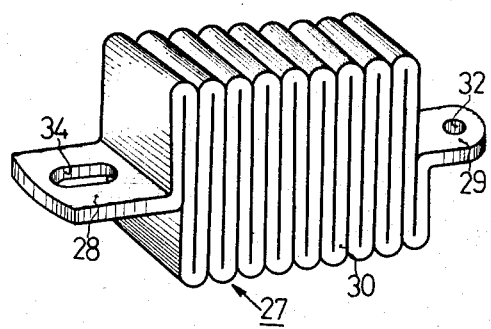
FIG. 2 is a perspective view of the energy absorbing member used in FIG. 1.

Referring now more particularly to the drawings, FIGS. 1 and 2 illustrate a preferred form of the collision device according to the invention incorporated in a seat assembly of a vehicle.

A sliding frame 22 is guided for movement in the forward and rearward direction of the vehicle on rails 21 fixed on the floor of the driver, or passenger compartment. Frame 22 permits adjustment of the seat, for example, with respect to the steering wheel, and is mounted on rollers to reduce friction. The frame 22 is provided with conventional means, not shown, for locking the frame and seat in its adjusted position. The seat cushion 23 is mounted on a base frame 24, whose rear end is pivotally joined to the rear end of frame 22. Thus, when the vehicle is struck from the rear, the frame 24 pivotally rotates in the direction of the arrow Y about the rear end of the frame 22, and relative to the frame 22 when the latter is locked to the vehicle chassis. The forward portion of the frame 24 is supported above and connected to the frame 22 by the energy absorbing member 27 as best shown in FIG. 2, comprises a plate formed of a resilient material having high resistance against deformation, for example mild steel, and which is folded a number of times alternately to form flat lamination, or folds normal to the expected collision force which is in the direction of the bearing portions 28,29 of plate. These bearing portions are aligned centrally at right angles to the laminations of the mid-portion 30 of the plate. The laminations, or folds are closely spaced, and adjacent folds abut one another. The bearings portions are provided with an elongated bolt slot 34 and a bolt hole 32, respectively, for attachment to the frames 22 and 24.

In FIG. 1, the adjustable frame 22 is provided with a bracket 35 having ears defining a channel into which is inserted the bearing portion 28 of the energy absorber 27, and bolt 36 is inserted through the opening 34 and through openings in the bracket ears. Similarly, the seat base frame 24 is provided with a dependent bracket 37 having ears defining a channel into which is inserted the bearing portion 29, and bolt 33 is inserted through the hold 32 and openings in the opposite ears of the bracket 37 to complete the fastening of the energy absorber member 27 between the frames 22 and 24 in a generally vertical position.

In the operation of the invention, normally, the weight of the person seated on cushion 23, compresses the energy absorbing member 27 through the seat cushion 23, the seat frame 24, and bearing portion 29. Because of the close spacing, or actual abutment of the laminations in mid-portion 30 of the absorber 27, said mid-portion is not deformed, but supports the weight of the person without plastic deformation. When the automobile is struck from the rear, while standing stationary, or moving slowly either forwardly or rearwardly, the person seated on the cushion 23, due to inertia, is subjected to a reverse shock force in a circular direction turning about the center of the rear of the seat as a fulcrum in the direction of the arrow Y, as shown in FIG. 1. The energy of the shock force is transmitted through the seat cushion, and since the lower end of the absorber member 27 is secured to the locked frame 22, the upper end 29 of the absorber device 27 will be moved, or turned in the direction of the arrow Y tending to lengthen the spring device 27. If the energy of the shock force is above a pre-selected minimum force which will plastically deform the spring device 27, the midportion 30 of said spring device will be stretched and deformed, opening spaces between the individual folds therein, and this deformation will absorb the energy of the shock force so that the person seated on the cushion 23 will be protected from injury. The actual movement of the seat 23 in the direction of the arrow Y is thus reduced because of the absorption of a large portion of the shock force in deforming the member 27 and This reduction of movement prevents injury to the seated passenger, or operator, by preventing, or greatly reducing the possibility of whiplash in which the preponderance of the force is exerted on the neck of the passenger by a sudden whipping motion.

Should the automobile be struck from the front, thus tending to stop the vehicle, or to move it rearwardly if stationary at the time of the collision, the inertia of the occupant seated on cushion 23 will tend to turn the cushion about its lower forward edge in the direction opposite arrow Y, but a plastic deformation of the energy absorber member 27 will not occur. However, since there is nothing in front of the seat to prevent the inertia of the occupant from moving his body forwardly, the ability to avoid injury will not be as great as in the occasion of the rear end accident. The occupant must then rely upon the use of the energy absorbing device in connection with parts of the vehicle other than the seat to minimize injury as, for example, use of the energy absorbing member with the front bumper.

It will be apparent, from the above description of the preferred embodiments, that the invention provides an energy absorbing member having a mid-portion in the form of a resilient plate highly resistant to plastic deformation and bent into folds which are in abutting relation, so that plastic deformation in the direction of compression of the energy absorbing member is not possible, but plastic deformation is effected to absorb tensile shock forces exerted in the opposite direction.

The energy absorbing member can be easily produced in large quantities because of the simplicity of its form and is most useful in those instances in which the shock force is relatively small because the energy absorbing member has a relatively small initial resistance against deformation because of having the mid-portion bent into folds. It will be understood that the described initial resistance against deformation can desirably be pre-selected by a suitable choice of the thickness, width, and material of the plate from which the energy absorbing member is shaped. While this description has been limited to a showing of one shock absorber device in the assembly, obviously a plurality, or as many as required may be used to support the associated vehicle part and to absorb any reasonable collision force.

Although a specific embodiment of the invention has been shown and described, it is obvious that modifications thereof are possible. The invention, therefore, is not intended to be restricted to the exact showing of the drawings and description thereof, but is considered to include reasonable and obvious equivalents.

What we claim is:

1. An energy absorbing device for absorbing collision energy in a vehicle such as an automobile, comprising a supporting member adapted to be fixed to one part of the vehicle structure, a receiving member displaceable with respect to the supporting member and adapted to be fixed to another part of the vehicle structure for receiving and transmitting the collison force, and an energy absorbing member having end portions connected respectively to the supporting member and the receiving member, the energy absorbing member being formed of a metal plate and the portion between the said end portions being closely folded to and fro in zig-zag manner with the adjacent folds in close contact with each other substantially throughout their lengths, whereby the energy absorbing member is deformable only upon the application of an external force tending to elongate the energy absorbing member but is rigid upon the application of a compressive external force.

2. A device according to claim 1, wherein the receiving member is a bracket on the base frame of a vehicle seat, and the supporting member is a bracket on a frame fixed to the vehicle chassis.

* * * * *